UNITED STATES PATENT OFFICE.

CHARLES GRAEBE, OF FRANKFORT-ON-THE-MAIN, AND CHARLES LIEBERMANN, OF BERLIN, PRUSSIA.

IMPROVEMENT IN DYES OR COLORING-MATTERS FROM ANTHRACENE.

Specification forming part of Letters Patent No. 95,465, dated October 5, 1869; Reissue No. 4,321, dated April 4, 1871.

DIVISION B.

*To all whom it may concern:*

Be it known that we, CHARLES GRAEBE, of Frankfort-on-the-Main, and CHARLES LIEBERMANN, of Berlin, in the Kingdom of Prussia, have invented a new and useful Improvement in the Manufacture of Alizarine; and we do hereby declare the following to be a full, clear, and exact description thereof, which will enable those skilled in the art to make and use the same.

We first change the anthracene into anthrakinon, (oanthracene,) a substance known to the chemists by the investigations of Anderson. For this purpose we take one part, by weight, of anthracene, two and one half parts, by weight, of bichromate of potash, and ten or fifteen parts, by weight, of concentrated acetic acid, and we heat these substances together in a vessel, either of glass or clay, to about 100° centigrade to 120° centigrade till nearly all of the bichromate of the potash is dissolved and the liquid has acquired a deep-green color. We then recover the acetic acid not consumed in the reaction by distillation and treat the residuum with water to remove the chromic acetate. From the insoluble mass we obtain the anthrakinon in a pure state by distilling the whole from a retort of glass or iron. In the place of acetic acid, sulphuric acid diluted with one or two parts of water may be employed. Instead of the method just described we also employ the following one:

We heat anthracene in a vessel of glass or of clay with ten parts of concentrated acetic acid to about 100° centigrade, or a little higher, and we add nitric acid of about 1.3 specific gravity in small portions till the violent reaction ceases. After distillation of the acetic acid we purify the residuum as before. We then convert the anthrakinon, prepared by one of the methods described, into bichromanthrakinon. For this purpose we take three parts of anthrakinon, five parts of bromine, and we heat these substances for ten or twelve hours, or until nearly the whole of the bromine has disappeared, to a temperature, by preference, of about 100° centigrade in a suitable close vessel, either of glass or enameled or glazed iron which is capable of sustaining the pressure which is generated by the reaction. The apparatus is then allowed to cool. It is opened in order to permit the escape of bromic acid, which can be recovered by absorption either in water or in alkaline solution. We purify the bibromanthrakinon remaining in the vessel as a solid substance by crystallization from benzole.

Instead of the method above described for preparing bibromanthrakinon, we also employ the following: We convert, first, the anthracene into a bromine derivative—into the tetrabromanthracene known to chemists by the investigations of Anderson. We take one part of this tetrabromanthracene, and we heat it in a retort of glass or clay with about five parts of nitric acid of about 1.3 specific gravity to 100° centigrade as long as vapors of bromine are evolved. We distill off the greater portion of the nitric acid, wash the residuum with water, and purify it by crystallization from benzole. We thus receive the bibromanthrakinon, as before, in a yellow solid mass. We then convert the bibromanthrakinon into alizarine. For this purpose we take one part of bibromanthrakinon, two to three parts of caustic potash or soda, and so much water as is necessary to dissolve the alkali, and we heat the same in an open vessel of glass, glazed or enameled iron, or silver to about 180° to 260° centigrade for one hour, or until the mass has acquired a deep-blue color. We then dissolve it in water and filter the violet solution, from which we precipitate the alizarine by inorganic acid. We collect the yellow flocks of alizarine thus obtained on a filter and wash them with water.

By these methods we receive the alizarine in a form in which it can be employed in the same manner as the different preparations from madder.

In the place of bromine, chlorine also may be employed, but not so conveniently, as the reactions above described are more difficult to accomplish with chlorine than with bromine

What we claim as new, and desire to secure by Letters Patent, is—

Artificial alizarine produced from anthracene or its derivatives, by either of the methods herein described, or by any other method which will produce a like result.

This specification signed by us this 30th day of November, 1870.

CHARLES GRAEBE.
CHARLES LIEBERMANN.

Witnesses as to the signature of Charles Liebermann:

H. KREISMANN,
B. MARASSE.

Witnesses:

OTTO PETZKE,
ROBT. PREUSS.